(12) United States Patent
Bekooij et al.

(10) Patent No.: US 11,513,206 B2
(45) Date of Patent: Nov. 29, 2022

(54) EFFICIENT PROCESSING FOR DIFFERENTIATING SIGNALS

(71) Applicant: NXP B.V., Eindhoven (NL)

(72) Inventors: Marco Jan Gerrit Bekooij, Empel (NL); René Geraets, Best (NL)

(73) Assignee: NXP B.V., Eindhoven (NL)

( * ) Notice: Subject to any disclaimer, the term of this patent is extended or adjusted under 35 U.S.C. 154(b) by 124 days.

(21) Appl. No.: 16/900,580

(22) Filed: Jun. 12, 2020

(65) Prior Publication Data
US 2021/0389443 A1 Dec. 16, 2021

(51) Int. Cl.
| | |
|---|---|
| G01S 13/04 | (2006.01) |
| G01S 7/02 | (2006.01) |
| G01S 7/35 | (2006.01) |
| G01S 13/34 | (2006.01) |

(52) U.S. Cl.
CPC .............. G01S 13/04 (2013.01); G01S 7/021 (2013.01); G01S 7/354 (2013.01); G01S 13/34 (2013.01)

(58) Field of Classification Search
CPC .......... G01S 13/04; G01S 13/34; G01S 13/18; G01S 13/532; G01S 13/5246; G01S 7/021; G01S 7/21; G01S 7/354; G01S 7/2927; G01S 7/2922; G01S 7/292
USPC ...................... 342/27, 195, 93, 91
See application file for complete search history.

(56) References Cited

U.S. PATENT DOCUMENTS

| | | | |
|---|---|---|---|
| 4,536,764 A | 8/1985 | Freeman | |
| 5,508,706 A * | 4/1996 | Tsou ....................... | G01S 7/032 342/192 |
| 6,380,887 B1 * | 4/2002 | Suen ...................... | G01S 7/2923 342/159 |
| 7,940,206 B2 * | 5/2011 | Nohara ................... | G01S 13/87 342/59 |
| 8,994,925 B2 * | 3/2015 | Lewis ..................... | G01S 17/10 356/4.01 |
| 9,576,468 B2 * | 2/2017 | Zack .................. | G01S 13/0209 |
| 9,846,228 B2 * | 12/2017 | Davis .................... | G01S 13/931 |
| 2006/0238406 A1 * | 10/2006 | Nohara ................. | G01S 13/937 342/90 |
| 2010/0332494 A1 | 12/2010 | Graefe | |
| 2015/0331098 A1 * | 11/2015 | Luebbert ................ | G01S 13/34 342/91 |

(Continued)

OTHER PUBLICATIONS

NXP Semiconductors. S32R274 Series Reference Manual, Rev. 4, May 2018, Chapter 45 Signal Processing Toolbox (SPT) (May 2018), pp. 2069-2079.

(Continued)

*Primary Examiner* — Erin F Heard
*Assistant Examiner* — Michael W Justice

(57) ABSTRACT

Exemplary aspects are directed to circuitry that assesses and differentiates a set of targeted data and updates a high-level bin with a numerical value indicating the number of data elements that compared successfully with a predefined value range defined for each bin. A cumulative sum of the high-level bins may then be calculated. Following, a target threshold may be compared to the cumulative sum at each bin and then providing an indication upon discovering a cumulative sum exceeding the threshold. The targeted data may be further refined by changing (through circuitry or other intervention) the predefined range values and then reprocessing the targeted data.

19 Claims, 4 Drawing Sheets

(56) References Cited

U.S. PATENT DOCUMENTS

2016/0379475 A1* 12/2016 Zack ................. G01S 13/62
                                                                342/21
2017/0293025 A1* 10/2017 Davis ................ G01S 7/0233
2017/0357452 A1   12/2017 Gregory
2018/0275259 A1*  9/2018 Ott ................... G01S 13/5246
2019/0391251 A1   12/2019 Bharadwaj, Jr. et al.

OTHER PUBLICATIONS

Harpreet Kaur and Neelofar Sohi "A Study for Applications of Histogram in Image Enhancement" The International Journal of Engineering and Science (IJES), vol. 6, Issue 6 (2017), pp. 59-63.

* cited by examiner

EFFICIENT PROCESSING FOR DIFFERENTIATING SIGNALS

OVERVIEW

Aspects of various embodiments are directed to signal detection/identification systems where it is beneficial to process and differentiate certain signals among a large number of signals in a relatively efficient manner.

Radar systems, which may be used to detect the range and velocity of nearby targets, provide a good example of such systems. Radar systems, such as continuous-wave radar systems, have been applied in many different applications including, for example; automotive radar systems which are used to enhance road safety. In such systems, a transmitter may transmit a signal at a given stable frequency towards an object as continuous wave radio energy which is then received as the energy is reflected by the object. These reflected signals include useful signals for such object detection so long as these useful signals can be differentiated from the backscattered noise received along with the useful signals. A specific example and type of Doppler-based radar system is referred to as frequency-modulated-continuous-wave (FMCW) radar which is used to measure distances of objects reliably by providing distance measurement as well as speed measurement, which is reliable as there is often more than one source of reflection arriving at the radar antenna.

In FMCW radars, a two-dimensional spectrum may be computed using an array or matrix which is sometimes referred to as a range-Doppler map. Peaks in this type of map may correspond with objects, in the physical scene, as sensed with the radar system. In radar terminology these objects may be referred to as targets. Only peaks that have a power that is a certain level (e.g., 7 dB, 10 dB or 12 dB) above the noise floor are considered as targets, the remaining peaks are considered noise. Therefore, it is helpful to know the level of the noise floor before attempting to distinguish noise from targets. However, this leads to a chicken and egg problem, because the level of the noise floor depends on what is, and what is not, considered a target. To break this cyclic dependency, a so-called ordered-statistical Constant False Alarm Rate (CFAR) algorithm may be used in conjunction with a histogram computation. Such a CFAR algorithm is often applied in radar systems to help in mitigating false detections. However, an issue is that computing a histogram may be, in terms of computational expense on a programmable processor, excessive and especially expensive in the number of clock cycles required for the computations such as when using currently-available digital-signal-processors that support wide SIMD instructions.

These and other matters have presented challenges to efficiencies of processing signals received in radar systems and related applications.

SUMMARY

In accordance with the present disclosure, various example embodiments are directed to issues such as those addressed above and/or as may be apparent from the following disclosure concerning efficient estimations of radar noise floors.

A specific example involves circuitry that assesses and differentiates a set of targeted data and updates bins (or accumulation circuits) with a numerical value indicating the number of data elements that compared successfully with a predefined value range defined for each of a plurality of bins. A cumulative sum of the high-level bin may then be calculated. Following, a target threshold/range may be compared to the cumulative sum at each bin and then provide indication upon detecting or discovering a cumulative sum exceeding the threshold/range. The targeted data may be further refined by changing (e.g., through circuitry or other circuit-based intervention) the predefined range values and then reprocessing the targeted data.

In another example, the present disclosure is direct to a method and apparatus involving a selection circuit and threshold-setting circuitry. The selection circuit is to: for a set of data including targeted data and other data characterized or represented by a numerical aggregation-based distribution of the data in a plurality of high-level bins each having a subset of data associated with the set of data, select one of the plurality of the high-level bins by assessing and differentiating relative to a high-level threshold associated with the targeted data, the subset of data in one of the plurality of bins relative to the subsets of data in each of the other of the plurality of high-level bins; and for the selected one the plurality of the high-level bins also having a numerical aggregation-based distribution of a subset of the set of data, assessing and differentiating certain of the targeted data in the subset relative to certain of the other data in the subset. The threshold-setting circuitry is to provide, in response to the high-level selection circuit, a refined threshold from which the targeted data may be further differentiated. In a more specific example embodiment, the discovered noise floor value may be used as the median of the range of the bin that crossed the threshold (e.g., after completing any refinement passes).

Further, in the above example, the selection circuit and the threshold-setting circuitry may operate by the threshold-setting circuitry providing multiple refined thresholds in response to the selection circuit providing at least one additional assessment and differentiation of the set of the data at a more refined level by using a previous one of the multiple refined thresholds.

In other specific example embodiments, SIMD (Single Instruction Multiple Data) circuitry may be configured to process, as described above, multiple targeted data element (e.g., 1024 or more elements) simultaneously.

In yet another specific example embodiment, circuitry may be configured so as to calculate cumulative sums concurrently with the update of such bin(s) due to successful targeted data assessment and differentiation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figures 1A, 1B:
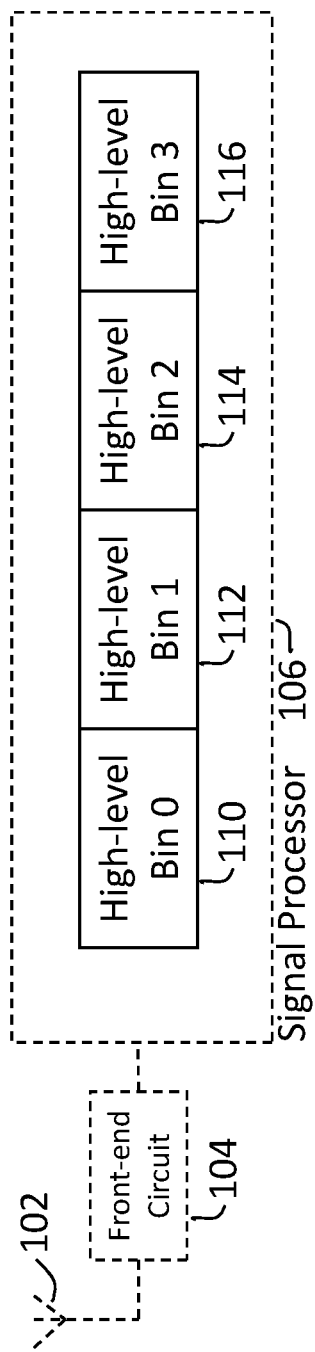
FIG. 1A is an exemplary diagram illustrating system with a signal processing circuit that uses a selection circuit having bins to store respective values, in each bin, representing the count of the assessed and differentiated data for each bin, in accordance with the present disclosure.
FIG. 1B is an exemplary diagram illustrating a selection circuit using bins to store a value, in each bin, representing the cumulative summation of the assessed and differentiated, data for each bin, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving efficient manners for processing large volumes of data which are characterized or represented by a distribution of numerical or categorical data. In certain implementations, aspects of the present disclosure have been shown to be beneficial when used in the context of processing radar-reflected signals systems. In some embodiments, an example method enables efficient computation in estimating a noise floor in radar data so as to allow discovery of targets in a noisy environment. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Certain examples of the present disclosure are directed to signal processing such as received signals via a selection circuit and a threshold-setting circuitry which are configured to help identify or differentiate certain of the received signals from other signals and/or undesirable background artifacts. In such examples, the selection circuit may operate on a set of data including targeted data and other data characterized or represented by a numerical aggregation-based distribution of the data in a plurality of (high-level) accumulation registers each having a subset of data associated with the set of data. For this set of data, the selection circuit is to select one of the plurality of the accumulation registers by assessing and differentiating relative to a high-level threshold associated with the targeted data (e.g., radar reflection information relative to noise), the subset of data in one of the plurality of accumulation registers relative to the subsets of data in each of the other of the plurality of accumulation registers. Further, for the selected one the plurality of the accumulation registers also having a numerical aggregation-based distribution of a subset of the set of data, the selection circuit may proceed by assessing and differentiating certain of the targeted data in the subset relative to certain of the other data in the subset. The threshold-setting circuitry may then provide, in response to the selection circuit, a refined threshold from which the targeted data may be further differentiated.

Certain more specific examples of the present disclosure are directed to aspects involving an apparatus including a radio-frequency (RF) Doppler-based radar system including a receiver and, in some instances, also including an associated transmitting RF transmitter. For example, the Doppler-based radar system may be frequency-modulated-continuous-wave (FMCW) radar system used to measure distances of objects reliably by providing distance measurement as well as speed measurement. The RF transmitter sends FMCW signals to be reflected off the objects and received via the RF receiver which picks up the reflected signals as though they are from more than one source as they are reflected in multiple RF paths before arriving at the RF receiver. The RF receiver receives and processes these reflected signals, similar to the previous discussion, using a selection circuit to process the signals via aggregation of relative signal values in accumulation registers (or bin) and threshold-setting circuitry to provide a refined threshold from which the targeted data may be further differentiated from such background artifacts which, in this specific example, may correspond to noise and the threshold corresponding to or being associated with the noise floor.

As the level of the noise floor may depend on what is, and what is not, considered to be a target or object from which the received signal is a reflected, in certain other specific examples consistent with the present disclosure, a version of an ordered-statistical (e.g., CFAR) algorithm may be used in conjunction with an array/matrix type of computation involving updates as more signals are input to be processed. For certain implementations, currently-available digital-signal-processors (computer circuits) that support wide SIMD instructions ("SIMD processors") may be used to implement the selection circuit and/or the threshold circuitry this regard.

Further, in the above example, the selection circuit and the threshold-setting circuitry may operate by the threshold-setting circuitry providing multiple refined thresholds in response to the selection circuit providing at least one additional assessment and differentiation of the set of the data at a more refined level by using a previous one of the multiple refined thresholds. For example, consider that the RF receiver in the radar system initially does not have a basis for which to set the initial threshold for differentiating relevant data, such as signals reflected from distal objects or targets, from data corresponding to noise. Because most of the received data or signals is expected to correspond to noise (e.g., 65%, 70% and/or 75% noise at any given time depending on the venue and signal dynamics), the above noted bins may be used to store a count of the number of incoming data elements, based on a scaled magnitude of signal level, falling within a more coarse statistical numerical range assigned for differentiating of the relevant data from the noise-related data. In this regard, the more coarse range is used as part of the assessment/comparison circuitry in initially determining and scoring (or weighting) the data via such scaling values, to be stored for aggregation in such bins. Based on this initial processing and assessment, further data is assessed at a less-course (more refined) level in which the processing circuitry zooms in the collected data for another iteration involving the assessment/comparison circuitry for another more-refined threshold setting to provide the next refined threshold for differentiating the more relevant data from the noise.

In some further examples which may also involve use of SIMD processors, such array/matrix type of computation be implemented as a type of histogram computation. However, unlike some known histogram computations wherein a logarithm of the signal power of each element of the range-Doppler matrix (that belongs to the same distance) is stored in the histogram and wherein such computational efforts are often excessive in terms of the number of clock cycles required for the computations, the above-described examples of using a selection circuit and threshold circuitry advantageously avoid such excessive computational efforts.

In yet other more specific examples using this approach and/or such a selection circuit and threshold circuitry, the selection circuit may process a plurality of numerical aggregation-based data as corresponding to the received or input signals, for processing in bins via an assessment and differentiation of the data based on numerical value(s). Each incoming data value is assessed and compared to an assigned differentiating numerical range to each of a plurality of high-level bins. If the data value lies within the assigned differentiating numerical range, assigned to the high-level bin, a counter/register is incremented and stored as the high-level bins value. Subsequent incoming data has its value compared at each high-level bin's assigned differentiating numerical range and if the new data value lies within the assigned differentiating numerical range for the high-level bin, a counter is incremented and stored, anew, as the high-level bins value. This example circuitry may continue to process the data (e.g., iteratively) as above until all data is has been processed.

Further, continuing with the above example, an equal number of a second set of bins/registers, referred to as the cumulative-sum registers, may be used to calculate the cumulative-sum registers of the high-level bin's values. In this example the first cumulative-sum register may add together the count values stored in first high-level bin and the count values stored in the second high-level bin, and subsequently storing the accumulated value. Similarly, the second cumulative-sum register may add together the count values stored in first high-level bin, the count values stored in the second high-level bin, and the count values stored in the third high level bin and subsequently storing the accumulated value. In a similar manner all remaining cumulative-sum registers may accumulate their total by adding together preceding high-level bin values.

In yet another more specific example that expands on the above-described aspects, the plurality of cumulative-sum registers may be compared to a preassigned threshold value. The example circuitry may compare the cumulative-sum register representing the smallest assigned differentiating numerical range first, indicated as cumulative-sum register 0. If this comparison indicates that the cumulative-sum register 0 value equals or exceeds the preassigned threshold, the example circuitry may indicate the cumulative-sum register 0 as the register of interest. If the comparison indicates that the cumulative-sum register 0 value is less than the preassigned threshold, the example circuitry may next compare the cumulative-sum register representing the next largest assigned differentiating numerical range indicated as cumulative-sum register 1. If the comparison indicates that the cumulative-sum register 1 value equals or exceeds the preassigned threshold, the example circuitry may indicate the cumulative-sum register 1 as the register of interest. If the comparison indicates that the cumulative-sum register 1 value is less than the preassigned threshold, the example circuitry may continue comparing the remaining plurality of cumulative-sum register in a similar manner as described above, and indicating the cumulative-sum register that equaled or exceeded the preassigned threshold.

In a further specific example following from the previous example, upon the example circuitry indicating the cumulative-sum register of which the value equaled or exceeded the preassigned threshold, the threshold-setting circuitry may assign new, refined, ranges to the differentiating numerical range associated to the plurality of high-level bins. The new ranges may be assigned to the plurality of high-level bins as to partition the previously assigned differentiating numerical range, associated with the threshold equaling/exceeding indicated cumulative-sum register, amongst the plurality of high-level bins. The example circuitry may then reprocess the numerical aggregation-base data and assess and differentiate it based on numerical value as described in the previous example. The preassigned threshold comparison process, described above, is re-executed to indicate a new cumulative-sum register of which the value equaled or exceeded the preassigned threshold. This process may be executed multiple times as required to identify a refined numerical aggregation-based distribution of the data.

In another specific example logic circuitry is SIMD (Single Instruction Multiple Data) logic circuitry (or computer processor) as described. In this example, the SIMD circuitry is configured and programmed to execute the required circuitry on one or more data elements simultaneously (e.g., 16 data elements). The SIMD circuitry, upon receiving multiple data elements may then process the data by executing the following steps, but not limited to; the assessment/comparison of assigned differentiating numerical range to the incoming data value(s); the incrementation of the plurality of high-level register and cumulative-sum register; and the comparison/indication of the cumulative-sum registers to the assigned threshold.

Turning now to the drawings and relating to the above-disclosed aspects and embodiments, FIG. 1A illustrates an example radar system depicting in particular the receive side with an antenna 102 for at least receiving (if not also sending) RF signals, a front-end circuit 104 to process and convert the RF signals to baseband levels for processing, and a signal processing circuit 106 which may include the above-characterized selection circuit and threshold circuitry. Aspects of the selection circuit and threshold circuitry are depicted in FIG. 1A as include and being associated with four (high-level) bins 110, 112, 114 and 116 which are used to store the count of the number of incoming data elements falling within the numerical range of the assigned differentiating numerical range of the assessment/comparison circuitry. Each of the bins accumulates totals for a portion of the expected numerical range. For example, using as an example a scaled/weighted assignment methodology in which the highest score is a "1" for indicating the strongest likelihood that the input data is relevant or desired data and "0" for indicating the strongest likelihood that the incoming data undesired data such as noise. Using, for example, a computer processor to implement such processing, part of the processor is programmed as a selection circuit to the above count and to select the more relevant subset of data in one of the plurality of bins relative to the subsets of data in each of the other of the plurality of the bins. Further, with the selected one the plurality of the high-level bins also having a numerical aggregation-based distribution of a subset of the set of data, the selection circuit can assess and differentiate certain of the targeted data in the subset relative to certain of the other data in the subset. This may be achieved, for example, by using a range comparison circuit (discussed further in connection with item 230 of FIG. 2).

The same or different logic/processor circuitry may be used as threshold-setting circuitry to provide, in response to the selection circuit, a refined threshold from which the targeted data may be further differentiated for providing a more accurate level from which a receiver may more accurately discern desirable data from other undesirable data such as RF interference noise. In another context, the desirable data may be S1 data (or a P wave in an ECG) associated with a heart monitor data, whereas the undesirable data may be the S2 (or a S wave in an ECG) which may not be relevant to the data at issue. Another context, the desirable data may be a certain seismogram signal whereas the undesirable data may be other certain seismogram signal(s) or noise collected with the certain seismogram signal.

In such exemplary methodology, the initial overall range may be from 0 to 1, and using four bin, Bin 0 depicted as 110 may indicate the number of incoming data elements with data values between 0 and 0.25. Similarly, the next Bin 1 depicted at 112, may indicate the number of incoming data elements with data values between 0.25 and 0.50, while the next Bin 2 at 114 may indicate the number of incoming data elements with data values between 0.50 and 0.75, and the next Bin 3 depicted at 116 may indicate the number of incoming data elements with data values between 0.75 and 1.00.

These bins may be used in at least one pass to assess the collected data to discern a likelihood that the data is more likely, e.g., statistically and/or based on iterations of more focused assessments of the data, more relevant or less relevant data. For example, in an initial pass to assess the collected data, an initial coarse or more broadly-based grouping of corresponding data elements these elements may be scaled/scored and stored as such to assess the initially collected data with a coarse indication of likelihood that the data grouped as such is relevant (or desired data) relative a threshold to differentiate from undesired data such as noise. Optionally and using such a more broadly-based grouping of corresponding data elements after such scoring or weighting the data, the grouped data may be further assessed by zooming in on the more relevant grouped data and iterating the above methodology, again but at more refined level, to discern a likelihood of whether that further grouped elements of such data (which has been discerned at least once already as having more relevant data) as is more likely to be relevant desired data or not.

Figure 2:
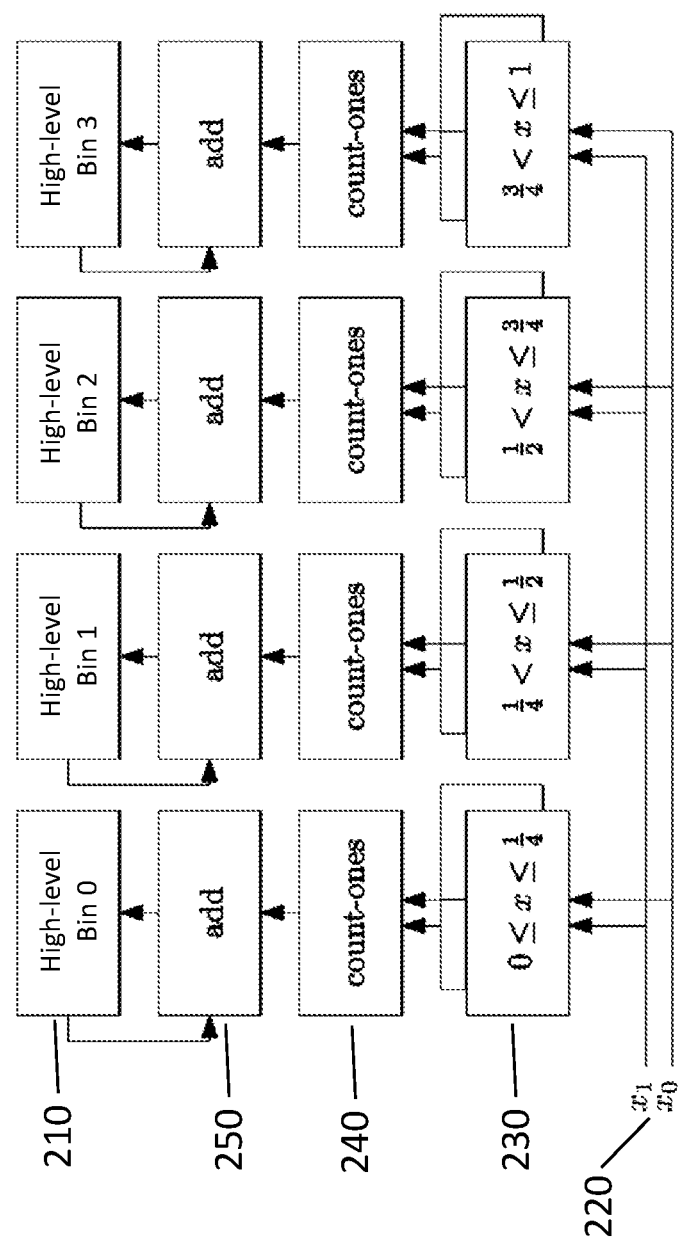
FIG. 2 is an exemplary block diagram of the system used to assess and differentiate incoming data and count and store the resulting count, in accordance with the present disclosure.

FIG. 1B is an example illustrating four cumulative-sum registers 120, 122, 124 and 126 used to store the count of the cumulative sum of the (high-level) bins which may be implemented as part of the above-characterized selection circuit and threshold circuitry. Further, in this example cumulative-sum register 0 at 120 may store the same value as Bin 0, depicted at 110. Cumulative-sum register 1 at 122 may store the summation of the values in high-level Bin 0 plus high-level Bin 1, depicted as 112. Cumulative-sum register 2 at 124 may store the summation of the values in bin 0 at 110 plus Bin 1 at 112 plus the value of Bin 2, depicted as 114. Cumulative-sum register 3 at 126 may store the summation of the values as stored in Bin 0 at 110 plus Bin 1 at 112 plus Bin 2 at 114 plus Bin 3 at 116. The above-characterized threshold circuitry, not explicitly depicted FIG. 2 is an exemplary embodiment illustrating an example of a circuit configured to assess and discriminate incoming data element(s) as exemplified by $x_1$ and $x_0$ 220. Block 230 has an assigned differentiating numerical range of 0 to ¼. Each of the incoming data element(s) 220 (1 or more) is compared to this assigned differentiating numerical range 230 and if it falls within the prescribed range the count-ones block 240 is incremented for each element that falls in range. Further, in this example, the count-ones block 240 value is added by the add block 250 to the high-level bin 0 (210) value and the then the total stored back into the high-level bin 0 (210).

Figure 3:
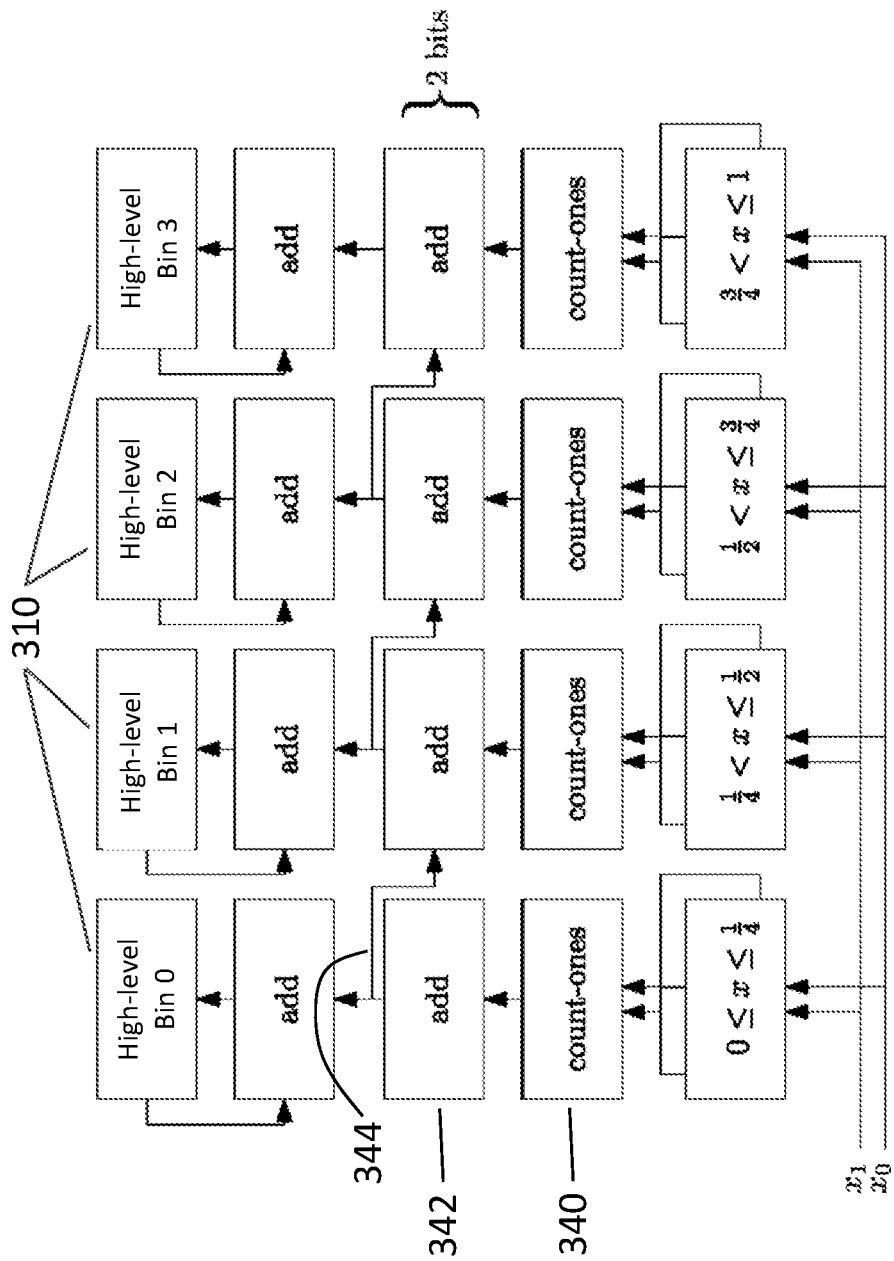
FIG. 3 is an exemplary block diagram of the system used to assess and differentiate incoming data and count and store the resulting count as well as an accumulated summation, in accordance with the present disclosure.

FIG. 3 expands on FIG. 2's example by adding a second add block 342 and a data path 344 to allow for the accumulation of the values provided by count-ones block 340. This allows for the calculation of the cumulative-sum value into four high-level bins 310.

Figure 4:
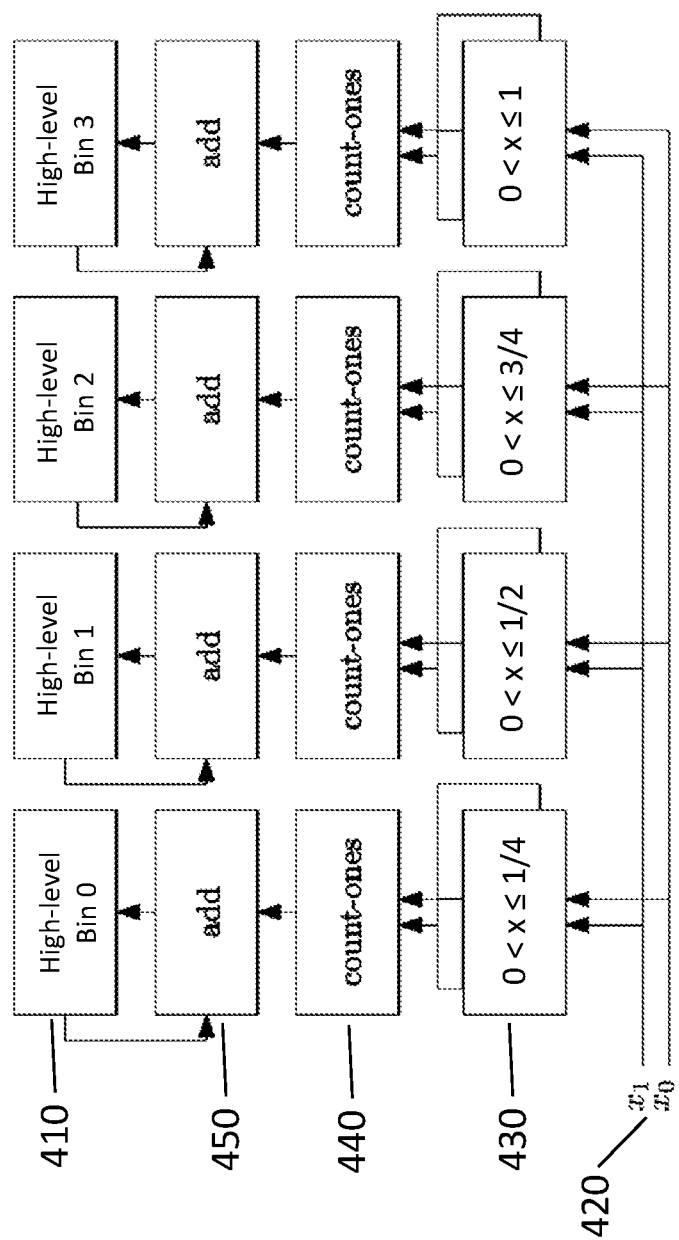
FIG. 4 is an exemplary block diagram of the system used to assess and differentiate incoming data and count and store the accumulated summation, in accordance with the present disclosure.

FIG. 4 illustrates another example, similar to FIG. 2, of an alternate circuit to calculate cumulative-sum values. By adjusting the assigned differentiating numerical range 430, used to assess/differentiate the incoming 420, from a range between two values to one value that is a maximum comparison value. This example system may calculate the cumulative sums directly into the high-level bins 410.

Another example consistent with the present disclosure is directed to a method which may improve the efficiency of a radar system's CFAR calculations, for example, in connection with SIMD-type processors as discussed previously. Such CFAR algorithms may be adapted to include use of such above-characterized selection circuitry and threshold-setting circuitry, with the radar receiver using an estimate of the correct threshold to discern or detect the presence of an object reflecting energy originally sent from the associated RF transmitter. In this example, a radar system it is desired to execute a CFAR algorithm so as to estimate the noise floor of the received data elements. After estimation of the noise floor, targets of interest may be identified as received data elements with a value greater than the noise floor (e.g. 10 dB greater than the noise floor). To discover a noise floor, an operation may be performed that combines the computation of a histogram with the computation of the cumulative sums. The cumulative sums can then be compared to a threshold (e.g. 0.7 times number of data elements processed) to identify, adjust and/or appropriately adapt to a reliable estimate of the noise floor.

Continuing with this radar system example, incoming data elements (SIMD vector) may be assessed and discriminated by comparing the element(s) to discover if they fall in a certain range that corresponds to a bin in a histogram. The range of values for each bin range may be changeable/programmable. If these values fall in the range for the compared bin then the binary output signal of the comparator becomes true and otherwise false. The number of trues may be counted for each set of parallel comparators for the same range. The counted number of trues may be added to the values in a register that corresponds to a bin of the histogram. After all values in the input vector are processed the cumulative sum of the values in the histogram-bin registers may be computed and stored in a vector. This may be followed by searching for the element in this vector for which the cumulative sum exceeds the defined threshold.

The range registers may then be reset so as to create refined histogram bins with ranges spanning only the range of the bin that exceeded the threshold. After adapting the ranges for the comparators and resetting the registers, the histogram operation is again applied to the vector of elements of the input data. After computation of the cumulative-sum over the bins of the second histogram and computing the element in the corresponding cumulative sum vector that exceeds the threshold, a more accurate estimate of the power-level of the noise-floor may obtained.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 210 and 230 of FIG. 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2 and 3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 2 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
    a selection circuit to,
        for a set of data including targeted data and other data characterized or represented by a numerical aggregation-based distribution of the data in a plurality of high-level bins each having a subset of data associated with the set of data, select one of the plurality of the high-level bins by assessing and differentiating relative to a high-level threshold associated with the targeted data, the subset of data in one of the plurality of high-level bins relative to the subset of data in each of the other of the plurality of high-level bins, wherein the selection circuit includes logic circuitry, including cumulative-sum registers, to calculate a cumulative sum vector; and
    a range comparison circuit to,
        for the selected one the plurality of the high-level bins also having a numerical aggregation-based distribution of the subset of data, assessing and differentiating certain of the targeted data in the subset of data relative to certain of other data in the subset of data; and
    threshold-setting circuitry to provide, in response to a high-level selection circuit, a refined threshold from which the targeted data may be further differentiated.

2. The apparatus of claim 1, further including a radar system including a transmitter and a radar receiver, wherein the radar receiver includes the selection circuit and the threshold-setting circuitry, and the radar receiver is to use the refined threshold to discern or detect presence of an object reflecting energy from the transmitter.

3. The apparatus of claim 1, further including a frequency-modulated-continuous-wave (FMCW) radar system including the selection circuit and the threshold-setting circuitry, and further including a logic circuit to provide the set of data in the plurality of high-level bins using a constant false alarm rate (CFAR) process to initially provide an estimate at which the high-level threshold associated with the targeted data is to be set, and wherein the selection circuit is further to accumulate data values from bin to bin and in response, provide the numerical aggregation-based distribution in the data the plurality of high-level bins.

4. The apparatus of claim 3, wherein the selection circuit is further to accumulate data values from bin to bin for the subset of the set of data and in response, provide the numerical aggregation-based distribution in the subset of the set of data.

5. The apparatus of claim 1, wherein the selection circuit is configured with SIMD (Single Instruction Multiple Data) logic circuitry.

6. The apparatus of claim 1, wherein the selection circuit and the threshold-setting circuitry are to operate by the threshold-setting circuitry providing multiple refined thresholds in response to the selection circuit providing at least one additional assessment and differentiation of the set of the data at a more refined level by using a previous one of the multiple refined thresholds.

7. The apparatus of claim 1, wherein the selection circuit and the threshold-setting circuitry repeatedly generate the numerical aggregation-based distribution of the data by using multiple passes, wherein for each pass the selection circuit generates at least one histogram associated with the set of data using a more refined numerical aggregation-based distribution of the data in bins.

8. The apparatus of claim 1, wherein the selection circuit is configured to further generate the numerical aggregation-based distribution of the data in multiple passes based on at least one refinement of the high-level threshold.

9. The apparatus of claim 1, wherein the selection circuit is configured to calculate cumulative sums without intermediately storing individual bins of assessed and differentiated data using a scaled comparison range including a numeric lower bound and a numeric upper bound.

10. The apparatus of claim 1, wherein the selection circuit is configured to calculate cumulative sums by intermediately storing individual bins of assessed and differentiated data using a scaled comparison range including a numeric lower bound and a numeric upper bound.

11. The apparatus of claim 1, further including an antenna, a front-end circuit coupled to the antenna and another circuit including the selection circuit and the threshold-setting circuitry.

12. The apparatus of claim 1, further including a radar receiver including the selection circuit.

13. A method comprising:
using selection circuitry to,
for a set of data including targeted data and other data characterized or represented by a numerical aggregation-based distribution of the data in a plurality of high-level bins each having a subset of data associated with the set of data, select one of the plurality of the high-level bins by assessing and differentiating relative to a high-level threshold associated with the targeted data, the subset of data in one of the plurality of high-level bins relative to the subsets of data in each of the other of the plurality of high-level bins, wherein the selection circuit includes logic circuitry, including cumulative-sum registers, to calculate a cumulative sum vector; and using a range comparison circuit to,
for the selected one the plurality of the high-level bins also having a numerical aggregation-based distribution of the subset of data, assess and differentiate certain of the targeted data in the subset of data relative to certain of other data in the subset of data; and using a threshold-setting circuitry to set a threshold in a discernment circuit to provide, in response to the selection circuitry, a refined threshold from which the targeted data may be further differentiated.

14. The method of claim 13, wherein the selection circuitry and threshold-setting circuitry operate by providing multiple refined thresholds in response to the selection circuit providing at least one additional assessment and differentiation of the set of the data at a more refined level by using a previous one of the multiple refined thresholds.

15. The method of claim 13, wherein the selection circuit is configured to further generate the numerical aggregation-based distribution of the data in multiple passes based on at least one refinement of the high-level threshold.

16. The method of claim 13, further including calculating cumulative sums using a scaled comparison range including a numeric lower bound and a numeric upper bound.

17. The method of claim 13, wherein the selection circuitry and threshold-setting circuitry repeatedly generate the numerical aggregation-based distribution of the data by using multiple passes, wherein for each pass the selection circuitry generates at least one histogram associated with the set of data using a more refined numerical aggregation-based distribution of the data in bins.

18. The method of claim 13, wherein the selection circuitry is configured with SIMD (Single Instruction Multiple Data) logic circuitry.

19. The method of claim 13, wherein the selection circuitry is part of a radio-frequency apparatus including an antenna and a front-end circuit coupled to the antenna.

* * * * *